(12) United States Patent
Al-Dayeh et al.

(10) Patent No.: US 7,539,332 B1
(45) Date of Patent: May 26, 2009

(54) METHOD AND SYSTEM FOR AUTOMATICALLY IDENTIFYING REGIONS OF TRABECULAR BONE TISSUE AND CORTICAL BONE TISSUE OF A TARGET BONE FROM A DIGITAL RADIOGRAPH IMAGE

(75) Inventors: Louai Al-Dayeh, Torrance, CA (US); Xiaoli Bi, Cerritos, CA (US)

(73) Assignee: CompuMed, Inc., Los Angeles, CA (US)

( * ) Notice: Subject to any disclaimer, the term of this patent is extended or adjusted under 35 U.S.C. 154(b) by 507 days.

(21) Appl. No.: 10/943,485

(22) Filed: Sep. 18, 2004

Related U.S. Application Data

(60) Provisional application No. 60/504,231, filed on Sep. 19, 2003.

(51) Int. Cl.
*G06K 9/00* (2006.01)

(52) U.S. Cl. ............................ 382/128; 128/922; 378/4

(58) Field of Classification Search ................. 382/128, 382/133, 131, 132, 100, 130; 128/922; 378/4–27; 250/370.08, 370.09
See application file for complete search history.

(56) References Cited

U.S. PATENT DOCUMENTS

| | | | |
|---|---|---|---|
| 6,246,745 B1 * | 6/2001 | Bi et al. | 378/54 |
| 6,442,287 B1 * | 8/2002 | Jiang et al. | 382/128 |
| 6,560,474 B2 * | 5/2003 | Lee et al. | 600/408 |
| 6,690,761 B2 * | 2/2004 | Lang et al. | 378/56 |
| 2005/0131662 A1 * | 6/2005 | Ascenzi et al. | 703/11 |

\* cited by examiner

*Primary Examiner*—Anand Bhatnagar
(74) *Attorney, Agent, or Firm*—Eric Ho

(57) ABSTRACT

System and method for automatically extracting at least one region of a first type of bone tissue from a target bone. A digital radiograph image with the target bone is received. Based on the digital radiograph image, at least one region of a first type of bone tissue is automatically identified or extracted. This region can then be utilized for different purposes, such as assessment, qualitative assessment, quantitative assessment, analysis, spatial domain analysis, frequency domain analysis, and calculation of one or more target bone features.

17 Claims, 18 Drawing Sheets

310

RECEIVE DIGITAL RADIOGRAPH IMAGE WITH TARGET BONE

315

320

APPLY IMAGE PROCESSING TECHNIQUES TO OBTAIN TARGET BONE CONTOUR AND CENTER AXIS

APPLY IMAGE PROCESSING TECHNIQUES TO AUTOMATICALLY IDENTIFY A FIRST PORTION (E.G. TRABECULAR BONE) AND A SECOND PORTION (E.G. CORTICAL BONE) OF THE TARGET BONE BASED ON BONE CONTOUR, CENTER AXIS

330

DETERMINING AT LEAST ONE FEATURE (E.G. DENSITY, MICRO-STRUCTURE OR DIMENSIONS) OF TRABECULAR BONE

340

DETERMINING AT LEAST ONE FEATURE (E.G. DENSITY, CORTICAL THICKNESS OR DIMENSIONS) OF THE CORTICAL BONE

FIGURE 3

| 710 |
|---|
| Draw the bottom line (884) in the middle between the waist line (844) and the lower widest cross-line (814). This line is the bottom limit of the cortical area on both the lateral side and the medial side. It is also the upper limit of the trabecular |

| 720 |
|---|
| The segmentation is done, cortical and trabecular areas are as follow:<br>Proximal trabecular (892): The lower half of the proximal triangle, i.e., below the bottom line (884)<br>Distal trabecular (894): within the distal circle<br>Lateral cortical (896): between the neck-line (824) on top, the bottom line (884) at the bottom, the lateral bone contour and lateral threshold line (if defined) on sides<br>Medial cortical (898): between the neck-line (824) on top, the bottom line (884) at the bottom, the medial bone contour and medial threshold line (if defined) on sides |

Fig. 7

METHOD AND SYSTEM FOR AUTOMATICALLY IDENTIFYING REGIONS OF TRABECULAR BONE TISSUE AND CORTICAL BONE TISSUE OF A TARGET BONE FROM A DIGITAL RADIOGRAPH IMAGE

This application claims the benefit of Provisional Patent Application Ser. No. 60/504,231 filed Sep. 19, 2003.

FIELD OF THE INVENTION

The present invention relates generally to image processing techniques applied to medical images, and more particularly, to a method and system for automatically identifying regions of trabecular bone tissue and cortical bone tissue of a target bone from a digital radiograph image.

BACKGROUND OF THE INVENTION

Radiographic Absorptiometry (RA) is utilized to measure volumetric bone mineral density (BMD) in the 2nd, 3rd, and 4th middle phalanges. The assignee of the present patent application has developed a technology referred to as the Osteogram™ technology to automatically generate the contour of the middle phalanges from a digital version of the 2-dimensional radiograph. The contour of the middle phalange may then be utilized to calculate the bone mineral density of the middle phalange. This BMD measure can then be utilized by health care workers to assess the risk of osteoporosis.

The middle phalange consists of two types of bones: the cortical bone and the trabecular bone. In certain applications, features of the cortical bone or features of the trabecular bone may be required because the cortical bone and the trabecular bone may respond differently to osteoporosis and aging. In other cases, the cortical bone and the trabecular bone may respond differently to different therapies.

For example, in some applications, it may be helpful to have the bone mineral density of the cortical bone and the bone mineral density of the trabecular bone instead of an integrated bone mineral density.

Unfortunately, prior art approaches are incapable or have undesirable disadvantages associated therewith. Two commonly utilized approaches to determining BMD are 1) single x-ray absorptiometry (SXA) and 2) dual x-ray absorptiometry (DXA). SXA and DXA use projectional technology and report an area density (e.g., mass per unit of projected area). Unfortunately, DXA only measures an integrated bone mineral density and is incapable for determining the specific density of the cortical bone and the trabecular bone.

A second approach is called Quantitative Computed Tomography (QCT). QCT is also a three-dimensional technology. QCT is capable of separately measuring the bone density of the cortical bone and the trabecular bone. However, the application of QCT is limited in practice due to high costs involved. For example, a single QCT procedure can cost several hundred dollars. There is also the added inconvenience and burden for the patient since the QCT procedure is not as readily available at hospitals and health care clinics as an X-ray machine due to QCT equipment's high installation and maintenance costs. The actual procedure is also more time consuming than other procedures, thereby placing a burden on both the patient and the person operating the QCT equipment. Furthermore, the QCT procedure potentially incurs a health cost because the patient is exposed to doses of radiation that are much higher than the normal X-ray.

Consequently, there remains a need in the art for a method and system for separately determining one or more features of cortical bone and the trabecular bone that overcomes the disadvantages of the prior art as set forth previously.

Moreover, determining what portions of a target bone shown in an x-ray, for example, is cortical bone tissue and what portions of a target bone shown in an x-ray, for example, is trabecular bone tissue are difficult tasks. When performed manually, this process is inaccurate, difficult to perform, and is subject to human error and bias. It would be desirable to perform these tasks automatically by using image processing software. Unfortunately, such software is not available.

Based on the foregoing, there remains a need in the art for a method and system for automatically identifying regions of trabecular bone tissue and cortical bone tissue of a target bone from a digital radiograph image that overcomes the disadvantages of the prior art as set forth previously.

BRIEF DESCRIPTION OF THE DRAWINGS

The present invention is illustrated by way of example, and not by way of limitation, in the figures of the accompanying drawings and in which like reference numerals refer to similar elements.

FIG. 3 is a flow chart illustrating the steps performed by the target bone feature generation mechanism in accordance with one embodiment of the invention.

FIGS. 5-7 is a flow chart illustrating in greater detail steps 430 to 450 of FIG. 4 in accordance with one embodiment of the invention.

SUMMARY OF THE INVENTION

Figure 1:
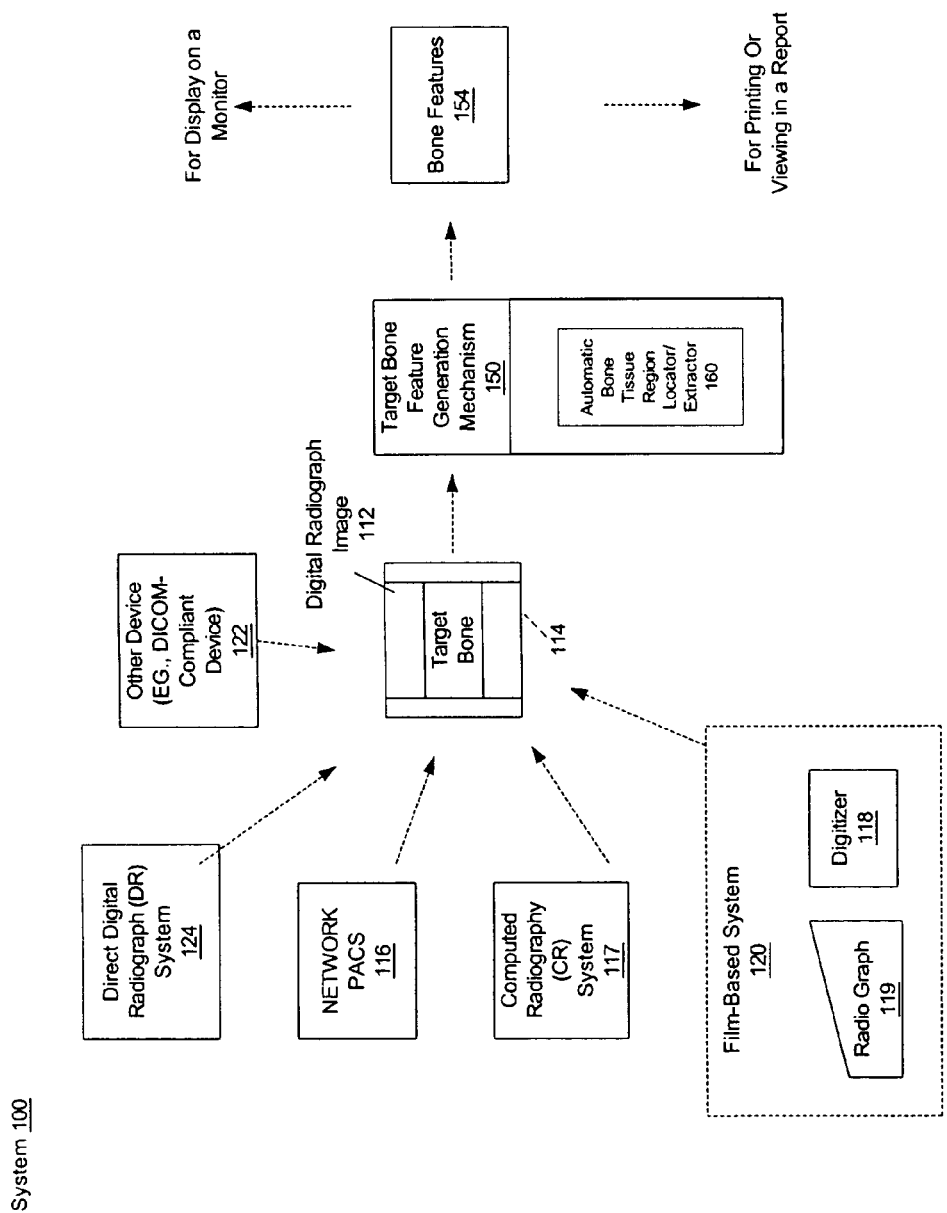
FIG. 1 illustrates a system in accordance with one embodiment of the present invention.

According to one embodiment of the present invention, a method and system for automatically classifying bone tissue in a target bone using a two-dimensional digital image of a bone is described. For example, an image processing method and system according to the invention has been developed to automatically distinguish a first type of bone tissue (e.g., cortical bone tissue) from a second type of bone tissue (e.g., trabecular bone tissue) in the target bone based on a two-dimensional (2D) digital image.

According to another embodiment of the present invention, the method and system for automatically identifying regions of trabecular bone tissue and cortical bone tissue of a target bone from a digital radiograph image includes the following components or processing steps. First, either a left contour or a right contour of a target bone (e.g., middle phalange) and a center axis corresponding to the target bone is automatically determined. Next, at least one anchor point on the left contour or right contour is automatically determined. The anchor point, left contour or right contour, the center axis are then employed to automatically extract or locate at least one region of first bone type (e.g., a region of cortical bone tissue), at least one region of second bone type (e.g., a region of trabecular bone tissue), or a region of first bone type (e.g., a region of cortical bone tissue) and a region of second bone type (e.g., a region of trabecular bone tissue).

In one embodiment, the region of a first type of bone tissue is stored in a first data structure, such as a two-dimension matrix. Similarly, the region of a second type of bone tissue is stored in a second data structure, such as a two-dimension matrix.

In another embodiment, the cortical bone tissue is automatically identified, located, or classified in the target bone. The identified region of the cortical bone tissue is then utilized to generate at least one bone feature (e.g., density, dimension, thickness, etc.).

In yet another embodiment, the trabecular bone tissue is automatically identified, located, or classified in the target bone. The identified region of the cortical bone tissue is then utilized to generate at least one bone feature (e.g., density, dimension, thickness, etc.).

In another embodiment, the cortical bone tissue is automatically identified, located, or classified in the target bone. Then, spatial domain analysis is performed on the identified region of the cortical bone tissue.

In yet another embodiment, the cortical bone tissue is automatically identified, located, or classified in the target bone. Then, frequency domain analysis is performed on the identified region of the cortical bone tissue.

In another embodiment, the trabecular bone tissue is automatically identified, located, or classified in the target bone. Then, spatial domain analysis is performed on the identified region of the trabecular bone tissue.

In yet another embodiment, the trabecular bone tissue is automatically identified, located, or classified in the target bone. Then, frequency domain analysis is performed on the identified region of the trabecular bone tissue.

In another embodiment, the trabecular bone tissue is automatically identified, located, or classified in a middle phalange. A BMD is then calculated based on the identified region of the trabecular bone tissue. The cortical bone tissue is also automatically identified, located, or classified in a middle phalange. A BMD is then calculated based on the identified region of the cortical bone tissue. Also, a cortical thickness is determined based on the identified region of the cortical bone tissue

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

The method and system for separately determining at least one feature of the cortical bone and the trabecular bone can be implemented in hardware, software, firmware, or a combination thereof.

System 100

FIG. 1 illustrates a system 100 in accordance with one embodiment of the present invention. The system 100 includes a source for providing a digital radiograph image 112 that includes a target bone 114 and a target bone feature generation mechanism 150.

The source can be, but is not limited to, a direct digital radiography (DR) system 124 that directly generates a digital radiograph image (e.g., a digital image that conforms to the Digital Imaging and Communication in Medicine (DICOM) standard). The source can also be, but is not limited to, a network Picture Archiving and Communication Systems (PACS) 116 from which a digital radiograph image 112 can be retrieved. The Picture Archiving and Communication Systems (PACS) can be coupled to communicate with other computers in a network by utilizing Transmission Control Protocol/Internet Protocol (TCP/IP). For example, the PACS 116 can be part of a networked environment, such as a hospital intranet, medical group network, or part of the Internet.

The source can also be, but is not limited to, a computed radiography (CR) system 117 that includes a re-usable plate and a reader for reading the plate and generating a digital radiograph image there from.

The source can also be, but is not limited to, a film-based system 120 that includes a digitizer 118 for digitizing a radiograph film 119 into a digital file (e.g., a TIFF file or other image file in another image format).

The source can also be, but is not limited to, another device 122 (e.g., a DICOM-compliant device) that provides a digital radiograph image 112 with a target bone 114.

Upon receipt of the digital version of the two-dimensional radiograph (which can be, but is not limited to, a 12 bit gray scale image), the target bone feature generation mechanism 150 generates one or more bone features 154. The target bone feature generation mechanism 150 includes an automatic bone tissue region locator/extractor 160 for automatically extracting, locating, identifying at least one region of a first type of bone tissue in a target bone. For example, the automatic bone tissue region locator/extractor 160 automatically divides or classifies a target bone into one or more regions and identifies those regions as a first bone type (e.g., a cortical bone tissue) or a second bone type (e.g., a trabecular bone tissue).

According to one embodiment of the invention, a method and system for classifying bone tissue using a two-dimensional digital image of a bone is described. For example, an image processing method and system according to the invention has been developed to automatically extract, locate, or identify a first type of bone tissue (e.g., cortical bone tissue) or a second type of bone tissue (e.g., trabecular bone tissue) in a target bone based on a two-dimensional (2D) digital image. In one example, the target bone is the middle phalange bone of a hand. However, it is noted that the target bone is not limited to the middle phalange, and the according to the invention can be applied to other bones in the body to distinguish between different types of bone tissue. The two-dimensional (2D) digital image can be, but is not limited to, a 2-dimensional x-ray image with the target bone that is scanned or digitized at a predetermined resolution (e.g., at a resolution of 230 dots per inch (dpi) or higher).

The regions that are extracted by the bone tissue region locator/extractor 160 may be stored individually in separate data structures. For example, the data structure can be a two-dimensional array. It is noted that the region can includes a plurality of pixels that form an area with any type of geometric shape (e.g., a square area, a rectangular area, a circular area, etc.).

The data structures that contain the regions of different bone tissue (e.g., a first region of cortical bone tissue and a second region of trabecular bone tissue) can then be analyzed or otherwise assessed by using different processing techniques. Example of these processing techniques include, but are not limited to, assessment, qualitative assessment, quantitative assessment, analysis, spatial domain analysis, frequency domain analysis, and calculation of one or more target bone features based on the identified regions, which are described in greater detail hereinafter.

It is noted that in another embodiment the automatic bone tissue region locator/extractor 160 can be implemented as a separate component from the target bone feature generation mechanism 150

It is noted that according to one embodiment of the invention, the target bone feature generation mechanism 150 automatically generates one or more bone features 154 without user intervention. It is further noted that according to another embodiment of the invention, the target bone feature generation mechanism 150 generates one or more bone features 154 with user intervention (e.g., a user may be asked to specify a region of interest).

These bone features 154 can include, but are not limited to, cortical bone density, trabecular bone density, integrated target bone density, cortical bone dimension (e.g., cortical width or thickness), and trabecular bone dimension. These bone features can be 1) displayed for viewing by a user on a display device (e.g., a monitor), 2) printed onto a report form, or 3) converted into a DICOM-compliant file that can be stored (i.e., media storage interchange (offline) communication) or communicated to another user in a network (i.e., network (online) communication).

Target Bone Feature Generation Mechanism 150

Figure 2:
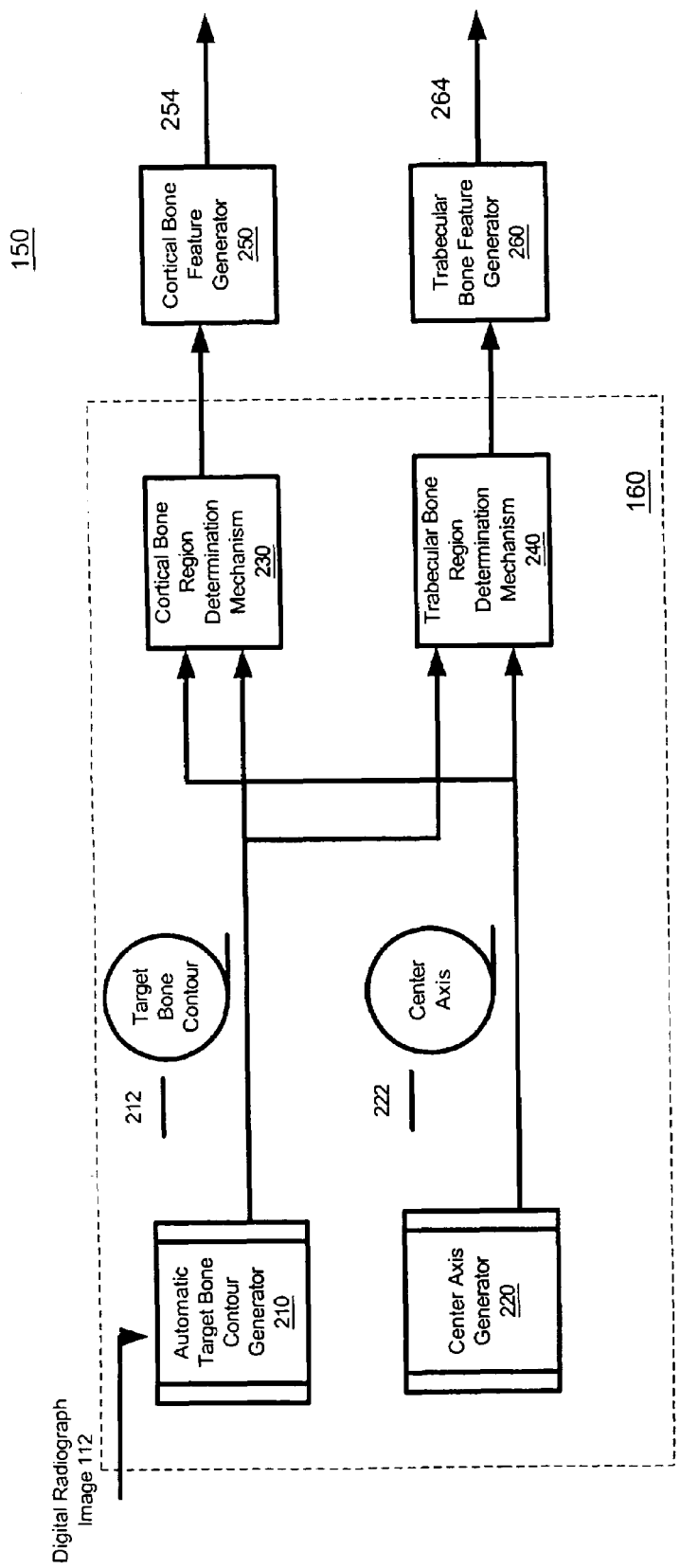
FIG. 2 is a block diagram illustrating in greater detail the target bone feature generation mechanism of FIG. 1 in accordance with one embodiment of the present invention.

FIG. 2 is a block diagram illustrating in greater detail the target bone feature generation mechanism 150 of FIG. 1 in accordance with one embodiment of the present invention. The target bone feature generation mechanism 150 includes automatic bone tissue region locator/extractor 160. The automatic bone tissue region locator/extractor 160 includes an automatic target bone contour generator 210 for manually or automatically generating a target bone contour 212 and a center axis generator 220 for manually or automatically generating the middle or center axis 222 of the target bone.

The automatic bone tissue region locator/extractor 160 generates at least one region of trabecular bone tissue, at least one region of cortical bone tissue, or at least one region of trabecular bone tissue and at least one region of cortical bone. The automatic bone tissue region locator/extractor 160 also includes a cortical bone determination mechanism 230 for automatically extracting the cortical bone from the target bone with or without user input and a trabecular bone determination mechanism 240 for automatically extracting the trabecular bone from the target bone with or without user input.

It is noted that in an embodiment described in greater detail hereinafter with reference to FIGS. 19 and 20, the automatic bone tissue region locator/extractor 160 can automatically generating one or more anchor points that are then utilized to automatically extract the regions of bone tissue.

The target bone feature generation mechanism 150 also includes a cortical bone feature generator 250 for manually or automatically generating at least one cortical bone feature 254 and a trabecular bone feature generator 260 for manually or automatically generating at least one trabecular bone feature 264. The cortical bone feature 254 can include, but is not limited to, a cortical bone dimension, cortical bone density, cortical bone mineral mass, cortical bone length, cortical bone volume, etc. The trabecular bone feature 264 can include, but is not limited to, a trabecular bone dimension, trabecular bone density, trabecular bone mineral mass, trabecular bone length, trabecular bone volume, etc. Preferably, blocks 210, 220, 230, 240, 250 and 260 are configured to automatically determine or generate the target bone contour, center axis, cortical bone contour, trabecular bone contour, cortical and trabecular bone features, etc. However, the teachings of this invention are equally applicable to a system in which one or more of the above functions or task are performed with the aid of a user (i.e., with manual intervention of a user to select a region of interest or otherwise input information into the system or otherwise interact with the system).

Target Bone Feature Generation Processing

FIG. 3 is a flow chart illustrating the steps performed by the target bone feature generation mechanism in accordance with one embodiment of the invention. In step 310 a digital radiograph image (e.g., a digital version of a two-dimensional radiograph) that includes a target bone is received. One manner to obtain a digital version of a two-dimensional radiograph is to digitize a radiograph with a digitizer. Alternatively, a Direct Digital Radiography system or other direct digital capture systems can be employed to directly generate a digital image (e.g., a digital version of a two-dimensional radiograph that includes a target bone). In a third approach, a re-useable plate and a reader (referred to as a "computed radiography (CR) system") is utilized by a regular X-ray machine to generate a digital file, such as a DICOM file. The digital version can be an image file that includes, but is not limited to, the following formats: a DICOM-compliant image file, TIFF image file, raw image file, JPEG image file, etc.

In step 315, imaging processing techniques according to the invention are applied to the digital radiograph image to obtain the contour of the target bone and the middle axis (also referred to herein as the "center axis" or "target bone axis") of the target bone.

In step 318, at least one anchor point is automatically determined. For example, the anchor point can be the point on either the left contour or the right contour corresponding either to line 824 or line 884. In one embodiment, processing step 318 may be implemented by utilizing the image processing techniques set forth and disclosed in a U.S. patent application entitled, "Method and System for Assaying Joint-Degenerative Diseases," filed on Jul. 20, 2003, and commonly owned by the assignee of the present application; the entire contents of said application being expressly incorporated herein by reference. The anchor point is utilized hereinafter in step 320 to automatically extract a region of a first type of bone tissue.

In step 320, imaging processing techniques according to the invention are applied to the digital radiograph image to identify at least a portion of the trabecular bone and at least a portion of the cortical bone based on the contour of the target bone (e.g., either the left bone contour or the right bone contour), the center axis, and the anchor point. Inage processing techniques for automatically identifying at least a portion of the trabecular bone and at least a portion of the cortical bone are described in greater detail hereinafter with reference to FIGS. 5-7.

In step 330, at least one feature (e.g., bone density, a bone dimension, bone mineral mass, bone volume, etc.) of the trabecular bone is determined. In step 340, at least one feature (e.g., bone density, a bone dimension, bone mineral mass, bone volume, etc.) of the cortical bone is determined. Steps 330 and 340 are preferably implemented using the teachings and disclosure set forth in U.S. Pat. No. 6,246,745, granted on Jun. 12, 2001, and entitled "Method and apparatus for determining bone mineral density", the entire contents of said patent being expressly incorporated herein by reference.

Figure 4:
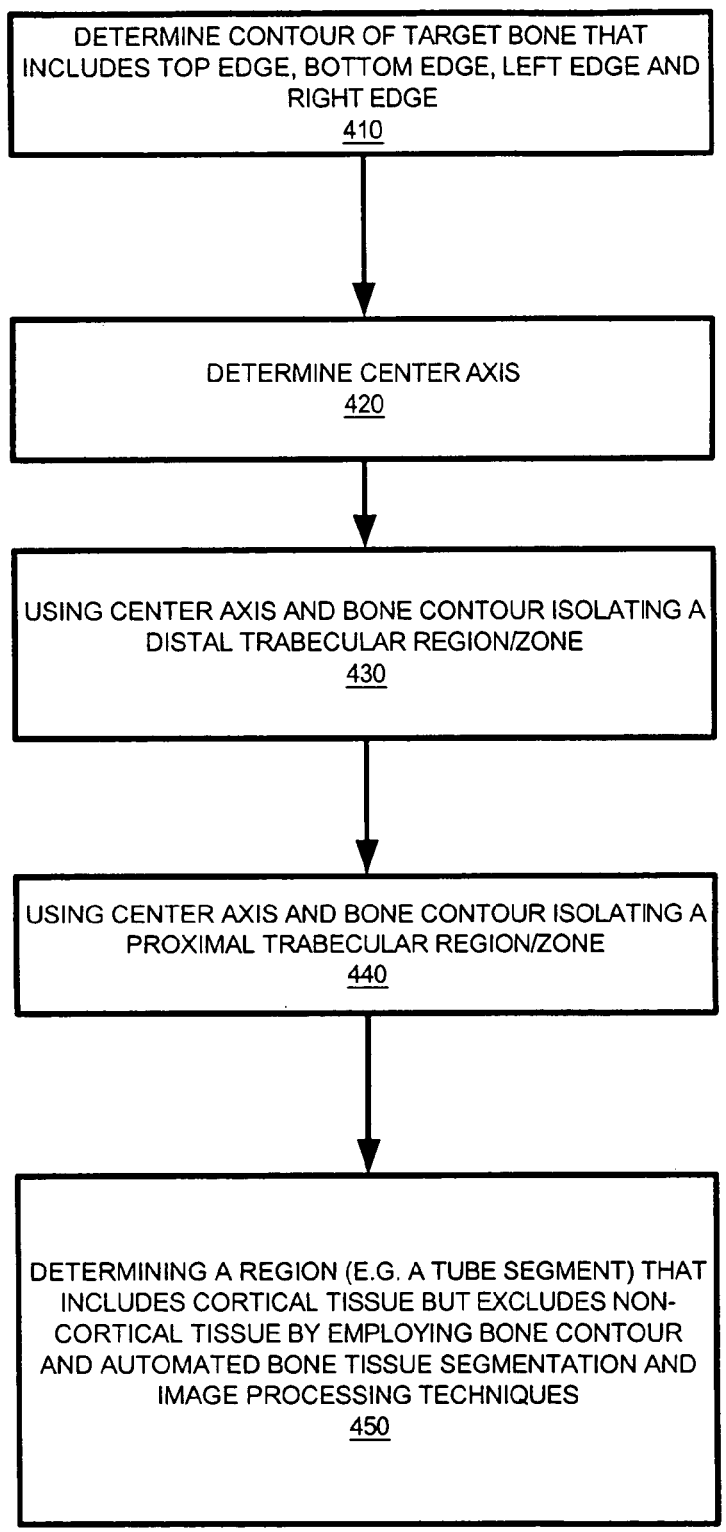
FIG. 4 is a flow chart illustrating in greater detail step 320 of FIG. 3 in accordance with another embodiment of the invention.

FIG. 4 is a flow chart illustrating in greater detail step 320 of FIG. 3 in accordance with another embodiment of the invention. In step 410, determining the contour of the target bone that includes the left bone edge, the right bone edge, the top bone edge and the bottom bone edge. Alternatively, the top joint edge pair and the bottom join edge pair may be provided from which the contour of the target bone may be derived. In step 420, determining the middle axis of the target bone. Steps 410 and 420 are preferably implemented using the teachings and disclosure set forth in U.S. Pat. No. 6,711,282, granted on Mar. 23, 2004, and entitled "Method For Automatically Segmenting A Target Bone From A Digital Image", the entire contents of said patent being expressly incorporated herein by reference.

In step 430, a distal trabecular region is determined (e.g., isolated) or extracted by employing the middle axis of the target bone and the target bone contour. In step 440, a proximal trabecular region is determined (e.g., isolated) or extracted by employing the middle axis of the target bone and target bone contour.

In step 450, a region (e.g., a tuber segment) that includes cortical tissue, but excludes central non-cortical tissue is determined by employing the target bone contour and target bone feature image processing techniques. In one embodiment, the target bone feature image processing techniques are automated.

In another embodiment, the target bone feature image processing techniques are user-assisted (e.g., a user may be instructed to select a region of interest). It is noted that two-dimensional regions discussed above may be projected into corresponding three-dimensional volumes, which in one example, is a cylindrical shape.

Image Processing Techniques for Automatic Feature Generation

Figure 5:
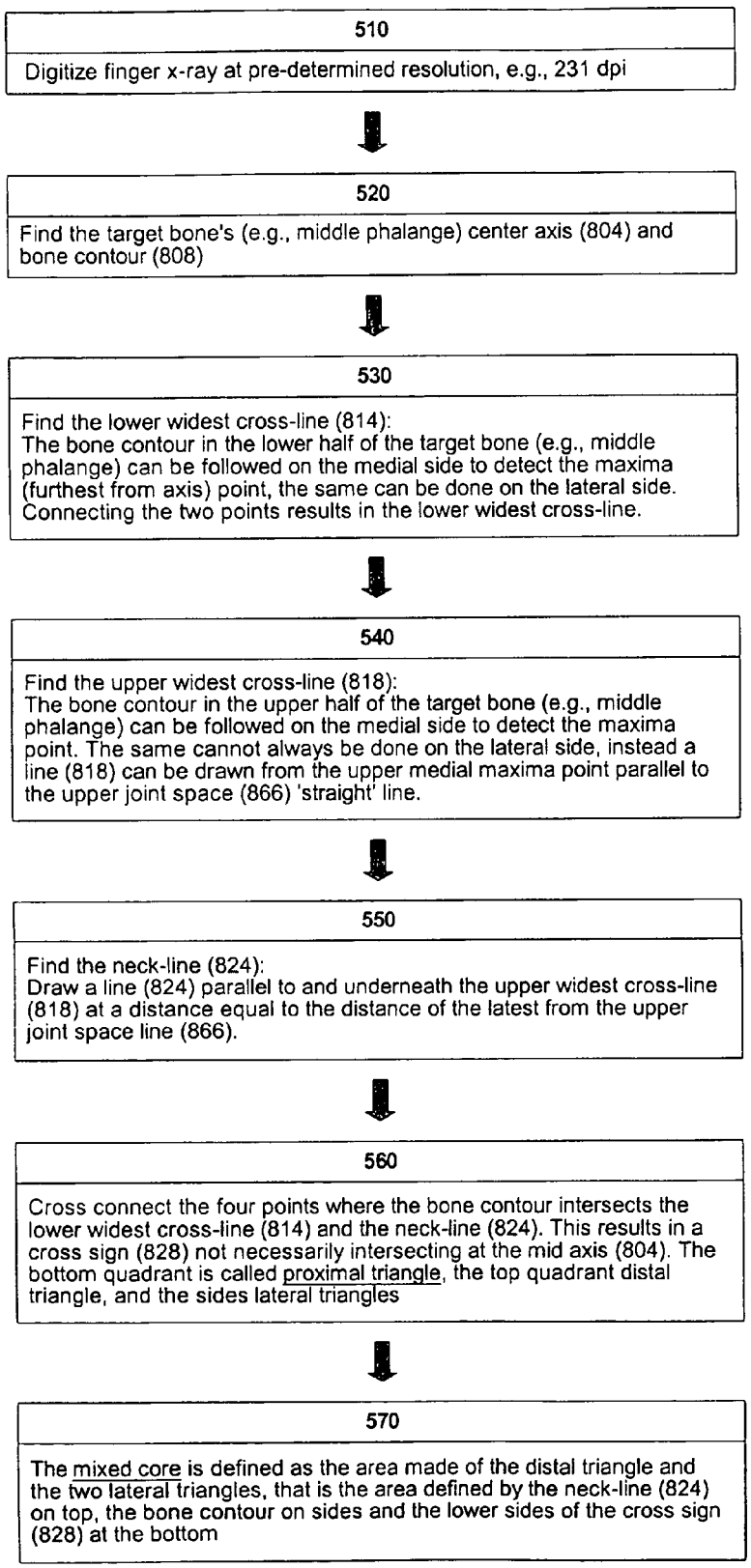
Figure 6:
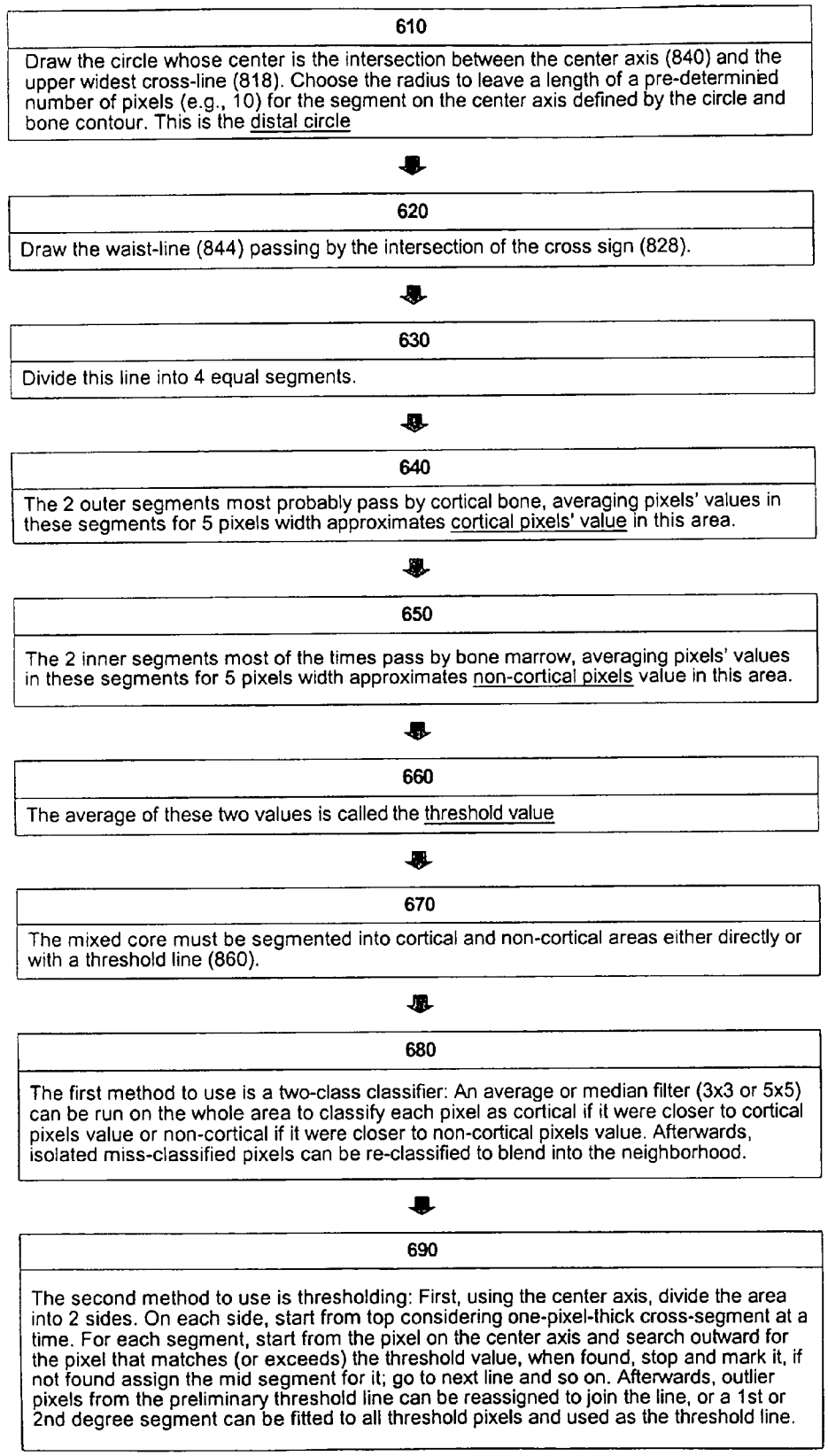

FIGS. 5-7 is a flow chart illustrating in greater detail steps 430 to 450 of FIG. 4 in accordance with one embodiment of the invention. FIGS. 8-16 illustrate various shapes, lines, and other drawing features utilized by the image processing techniques according to the invention to extract features of the target bone. The processing steps described in FIGS. 5-7 correspond generally with the drawing features illustrated in FIGS. 8-16 in the following manner.

Figure 8:
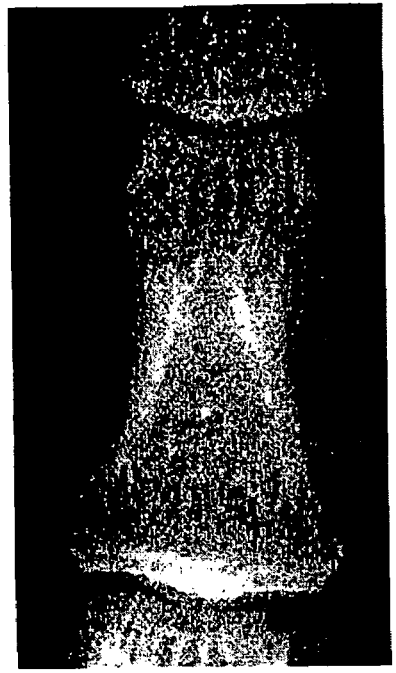
FIGS. 8-16 illustrate a target bone various image processing steps that correspond generally with the processing steps illustrated in FIGS. 5-7 in accordance with one embodiment of the invention.
Figure 9:
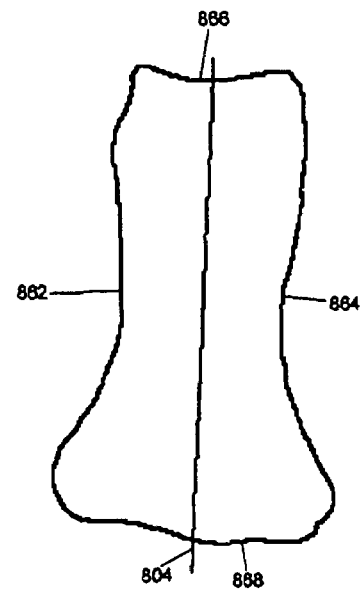
Figure 10:
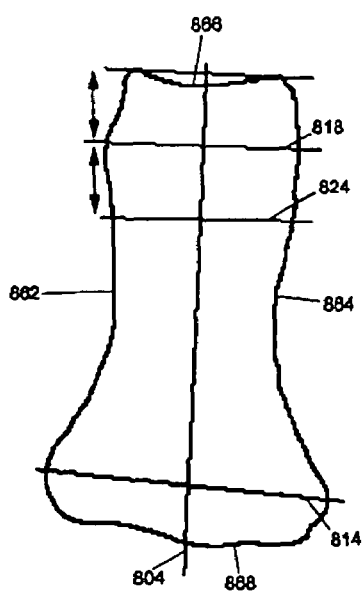
Figure 11:
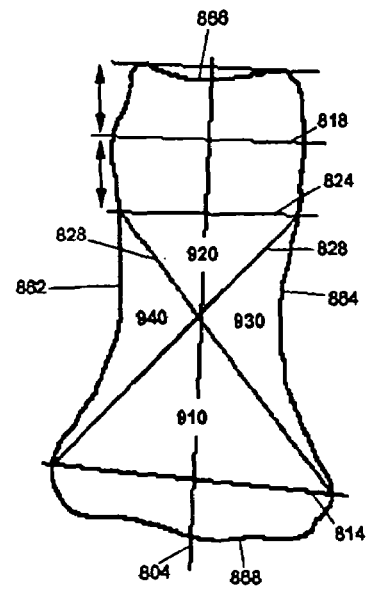

FIG. 5 illustrates processing steps 510 to 570. FIG. 8 corresponds generally to step 510. FIG. 9 corresponds generally to step 520. FIG. 10 corresponds generally to steps 530 to 550. FIG. 11 corresponds generally to steps 560 to 570. It is noted that certain exemplary values are provided in the flow-charts. However, it should be understood that these values are not limiting in nature, but merely to provide one example of a value that was employed in one embodiment of the invention. Other values may be utilized or selected to meet the requirements of different applications or to achieve other image processing goals.

For example, in step 510, it should be understood that the two-dimensional radiograph can be digitized at any predetermined resolution to suit a particular application. An exemplary value of 231 dpi is provided as an example of a value utilized in one embodiment of the invention. Similarly, although steps 530 to 550 are described in context of image processing a middle phalange it is noted that the teachings of the invention are applicable to other bones in the body (e.g., a hip bone, a bone in the spine, etc.).

Figure 12:
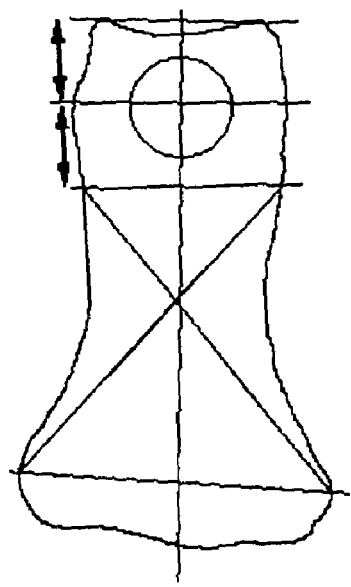
Figure 13:
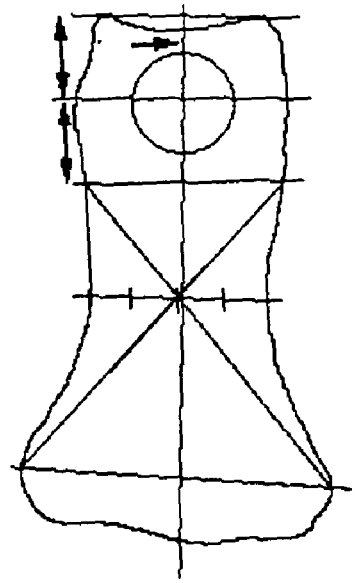
Figure 14:
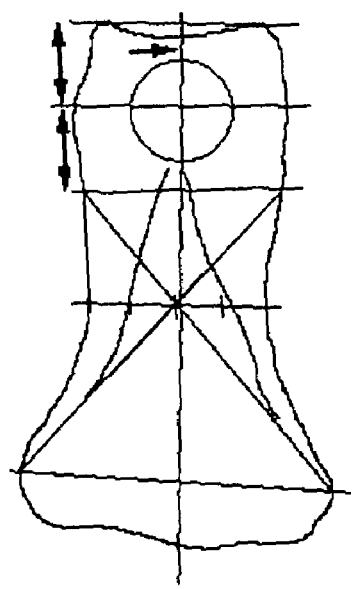

FIG. 6 illustrates processing steps 610 to 690. FIG. 12 corresponds generally to step 610. FIG. 13 corresponds generally to steps 620 to 660. FIG. 14 corresponds generally to steps 670 to 690. In step 610, it should be understood that radius of the circle can be any predetermined length and is not limited to 10 pixels. The 10 pixel value is provided merely as a non-limiting example of a distal circle utilized by the image processing techniques according to the invention. Similarly, it should be understood that any predetermined number of pixels may be averaged in steps 640 to 650 for approximating the cortical pixels' value and the non-cortical pixels value, respectively. The 5 pixel width is provided merely as a non-limiting example of a number of pixels that may be utilized by the image processing techniques according to the invention. Similarly, the size of the average filter in step 680 may be selectively modified to have values different from 3×3 or 5×5 in order to suit the requirements of an application.

Figure 15:
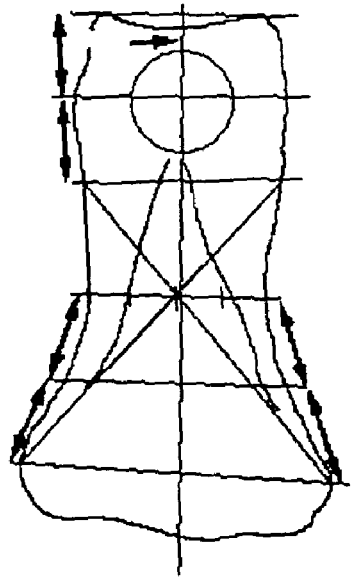
Figure 16:
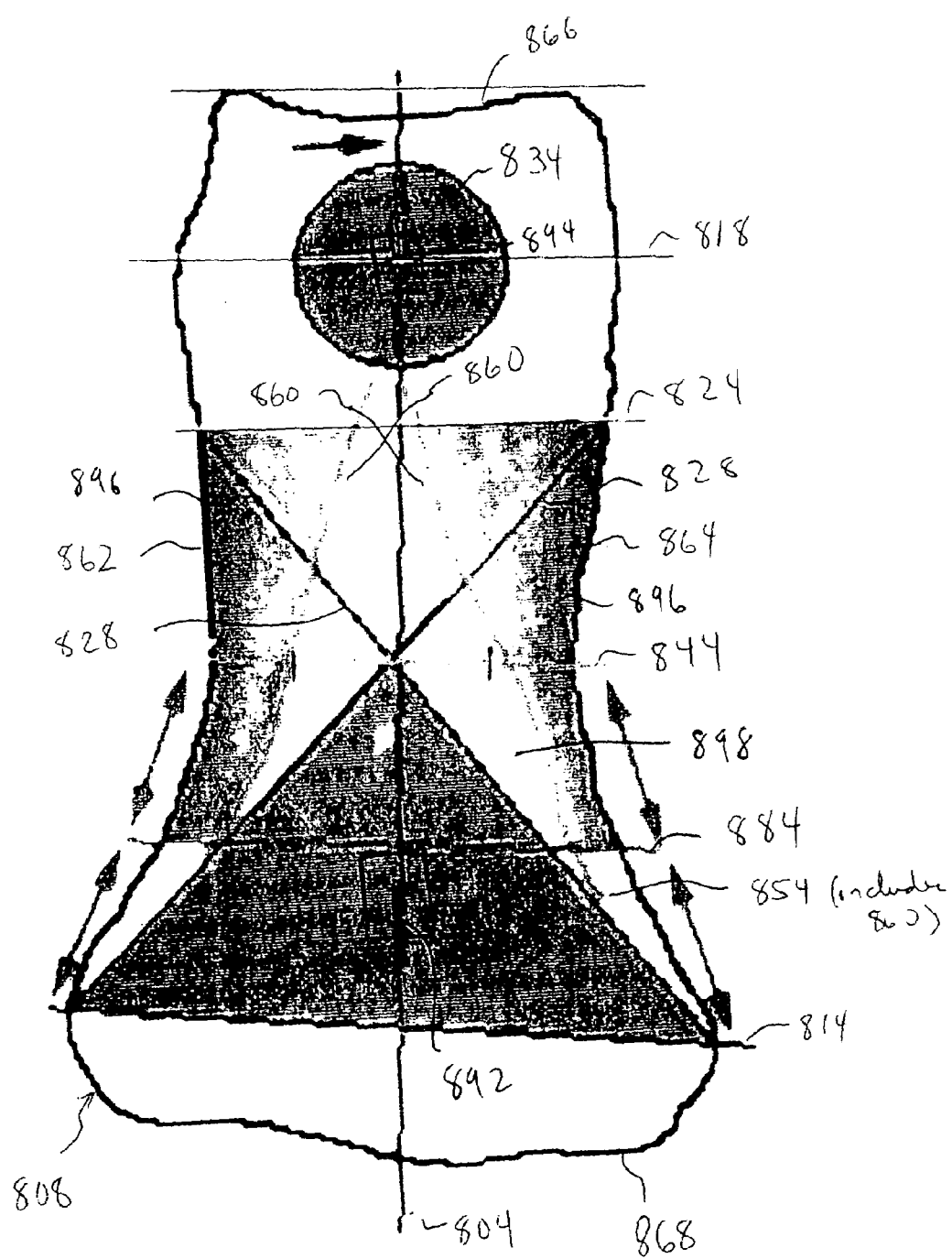

FIG. 7 illustrates processing steps 710 to 720. FIG. 15 corresponds generally to step 710. FIG. 16 corresponds generally to steps 670 to 690 and 720.

Various Shapes, Lines, and Other Drawing Features Utilized by the Image Processing Techniques Use for Automatic Bone Feature Generation Center Axis: 804
    Contour (that includes the top, bottom, left and right bone edges): 808
    Lower Widest Cross Line: 814
    Upper Widest Cross Line: 818
    Neck Line: 824
    Cross Sign: 828
    Bottom Quadrant Proximal Triangle: 910
    Top Quadrant Distal Triangle: 920
    Side Lateral Triangle: 930
    Mixed Core: 830
    Circle (or "Distal Circle"): 834
    Waist Line: 844
    Threshold Line: 854
    Lateral Cortical Line or Contour: 860
    Left Bone Edge or Contour (of Target Bone): 862
    Right Bone Edge or Contour (of Target Bone): 864
    Top Bone Edge or Contour (of Target Bone): 866
    Bottom Bone Edge or Contour (of Target Bone): 868
    Bottom Line: 884
    Proximal Trabecular Area: 892
    Distal Trabecular Area: 894
    Lateral Cortical Area: 896
    Medial Cortical Area: 898

Processing step 670 can include the following sub-steps in accordance with one embodiment:
    a. Apply unsharp filter to target bone image (e.g., image of the middle phalange);
    b. Use the waist-line 844, center axis 804 (also referred to herein as middle axis 804), left bone edge 862 and right bone edge 864 as the reference lines to start detecting the separation point that make up the lateral cortical line 860. The separation points separate the cortical bone from trabecular bone (e.g., the separation points).

c. Divide the area into 2 sides using the axis, left and right. Search from the left bone edge 862 to the middle axis 804 to find the pixel with the minimum gray shade (e.g., pixel with the minimum optical density) and label as a separation point candidate;

d. Add the selected point candidates to a new contour 860 (which is referred to as the lateral cortical line 860);

e. Repeat the process line by line in the defined region (e.g., between the neck line 824 and the bottom line 884);

f. Apply median filter to the contour to smooth the curve;

g. Apply well-known image processing algorithm to clean up contour (e.g., to add or eliminate points to ensure no redundant points at the same Y coordinate). The resulting contour is the lateral cortical contour or line 860 in FIG. 16.

h. Same procedure can be applied to bottom or top to detect cortical thickness.

Figure 17:
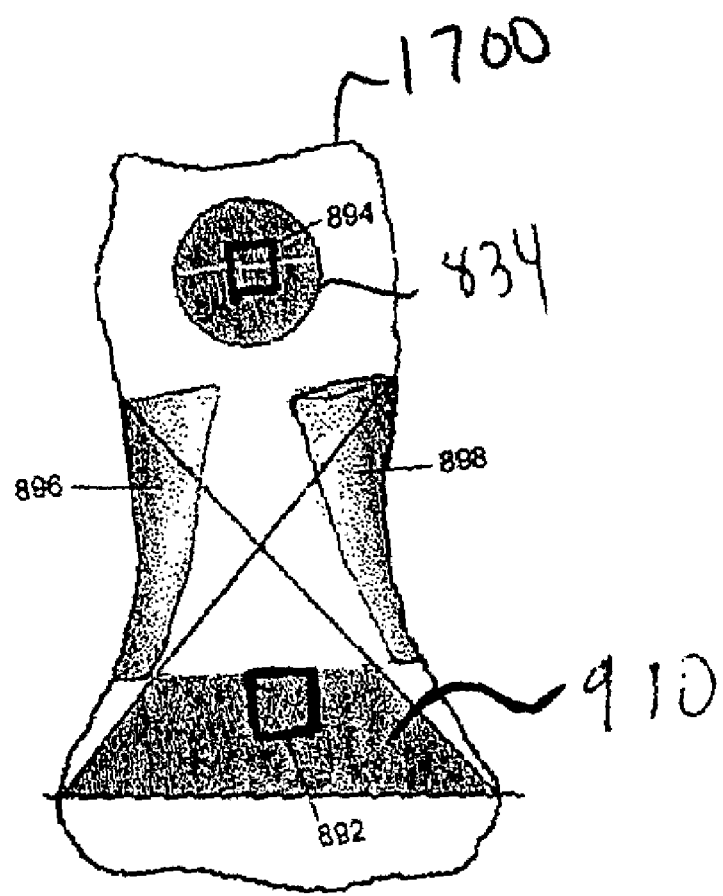
FIG. 17 illustrates various regions of bone tissue generated by the image processing techniques according to the invention.

FIG. 17 illustrates various regions of bone tissue automatically identified or extracted by the image processing techniques according to the invention. The image processing techniques according to the invention can be applied to a target bone 1700. The target bone 1700 can be composed of a first type of bone tissue (e.g., cortical bone tissue) and a second type of bone tissue (e.g., trabecular bone). For example, the automatic bone tissue extraction mechanism according to the invention automatically locates or identifies a first intermediate region 834 of trabecular bone tissue, a second intermediate region 910 of trabecular bone tissue, a first final region 894 of trabecular bone tissue, a second final region 892 of trabecular bone tissue, a first region 896 of cortical bone tissue, and a second region 898 of cortical bone tissue The method and system for determining trabecular and cortical bone features of a target bone from a digital radiograph image according to the invention can be applied to the target bone 1700 to generate cortical bone features and trabecular bone features. As can be appreciated, method and system for determining trabecular and cortical bone features of a target bone the according to the invention has a variety of different applications that can assist different medical professionals by providing one or more cortical bone and trabecular bone features.

In one application, the method and system for determining trabecular and cortical bone features of a target bone the according to the invention can provide information (e.g., features) to a radiologist about the cortical bone and trabecular bone to assist in diagnosing osteoporosis or other bone disease.

In another application, the method and system for determining trabecular and cortical bone features of a target bone the according to the invention can provide information (e.g., features) to an orthopedic surgeon about the cortical bone and trabecular bone for use in procedures involving a target bone (e.g., hip area or knee area). Moreover, the method and system for determining trabecular and cortical bone features of a target bone the according to the invention can be a stand-alone product for a specific application or integrated into a suite of software tools that are utilized by medical professionals to perform their respective task (e.g., diagnosis and treatment). Since the input to the invention is a digital image (e.g., a DICOM-compliant image file), the source of the digital image can be a film-based system (e.g., standard X-ray machine), a computed radiography (CR) system that employs a re-usable plate and reader, or a direct radiography (DR) system that directly generates a digital image.

Figure 18:
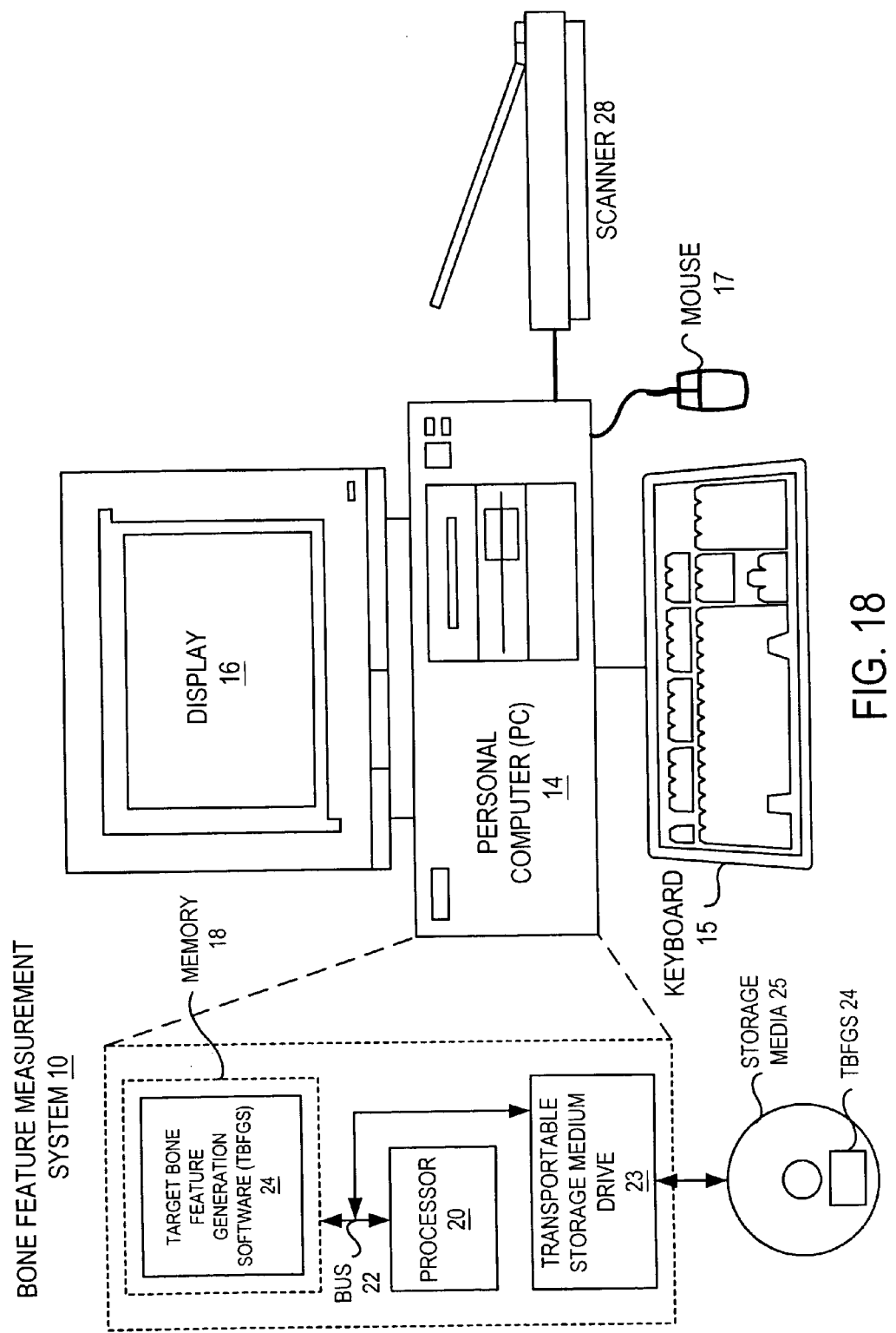
FIG. 18 is a block diagram illustrating a bone feature measurement system according to the present invention.

FIG. 18 is a block diagram illustrating a bone feature measurement system according to the present invention. System 10 includes a personal computer (PC) 14 that is coupled to a user input device, such as a keyboard 15, for allowing a user to input information and a cursor pointing device, such as a mouse 17, for controlling mouse functions. PC 14 is also coupled to a display 16, which can be a monitor. PC 14 also has a processor 20 for executing programs that is coupled via a bus 22 to a memory 18 for storing programs, such as the target bone feature generation software (TBFGS) 24 of the present invention. System 10 can also include a digitizer (e.g., a scanner) 28 for scanning information, such as x-ray film, into PC 14. The PC 14 can also include a transportable storage medium drive 23 for reading from and/or writing to transportable storage media 25, such as a floppy magnetic disk or writable optical compact disk (CD). Storage media 25, which is a computer readable media, can include target bone feature generation software (TBFGS) 24 of the present invention. The PC 14 can also be coupled to a network (e.g., a local area network, an intranet or the Internet) through a network connection (e.g., a network card). In this manner, the PC 14 can access digital files (e.g., DICOM-compliant digital image files). The PC 14 can be a terminal or a workstation that is coupled to a Picture Archiving and Communication Systems (PACS) 116 from which a digital radiograph image 112 (which is the input to the invention) can be retrieved. PC 14 can be coupled to communicate with other computers in a network by utilizing Transmission Control Protocol/Internet Protocol (TCP/IP). For example, the PC 14 can be part of a networked environment, such as a hospital intranet, medical group network, or part of the Internet.

Study Validating the Use of a Digital Image of a Two-Dimensional Radiograph for Estimating Cortical Bone Density and Trabecular Bone Density A study validating the use of a digital image of a two-dimensional radiograph for estimating cortical bone density and trabecular bone density is attached as Appendix I.

A cross-sectional study was conducted to investigate the ability of Radiographic Absorptiometry (RA) to separate cortical bone density and trabecular bone density in the middle phalange. This study included hand x-rays in 556 Chinese patients. These x-rays were analyzed to compare the rate of decline of cortical BMD, trabecular BMD, and total phalangeal BMD with age.

A normal Chinese population with no known osteoporosis or arthritis, ages 10 to 89, including 277 male and 279 female, were considered for the study. A two view standard AP x-ray was acquired for the non-dominant hand of each volunteer with an aluminum reference wedge placed near the hand. Based on the OsteoGram® technology (CompuMed Inc, Los Angeles, Calif.), which applies RA, a bone target feature generation mechanism according to the invention performs automated bone tissue segmentation isolating three distinct areas in each phalanx:

1. A first portion (e.g., an axial cylinder having a height of 2.2 mm and a diameter of 2.2 mm) in the middle of the distal trabecular zone.

2. A second portion (e.g., an axial cylinder having a height of 2.2 mm and a diameter of 2.2 mm) in the middle of the proximal trabecular zone.

3. A third portion (e.g., a tube segment in middle of the phalanx with a height of 6.6 mm) that includes the cortical tissue and excludes the central non-cortical tissue.

FIG. 1 of the study illustrates the regions of the phalange (e.g., three distinct areas in the phalange) that are employed by the invention to calculate one or more features for the cortical bone and the trabecular bone.

The module according to the invention performed BMD assessments in the cortical bone, BMD assessments in the two trabecular bone areas, and the standard BMD assessments for the total phalange.

Considering the two radiographic views for each volunteer's hand and the three bones in each view, the unsupervised automated algorithm For males and females, the differences between the two trabecular areas (1 & 2) were insignificant. For males, BMD decreased at the same rate in both trabecular and cortical tissues (~−0.3), where as total BMD decreased at a higher rate (~−0.5). For females, trabecular BMD decreased at a slightly higher rate than male (~−0.4). However, cortical BMD decrease was much higher and close to total BMD decrease at the rate of −1.0.

We were able to successfully separate the trabecular areas and cortical areas in phalangeal bones. Adding cortical and trabecular measurements to the Radiographic Absorptiometry (RA) bone mineral density (BMD) report provides useful information to assist clinicians in monitoring response to therapies and assessing trabecular versus cortical bone loss.

Moreover, during the measurement related to target bones (e.g., the middle phalange), the target bone may be successfully isolated so that movement of the target bone does not exist or negligible. Furthermore, the middle phalange does not have much soft tissue and thus, may be easily flattened so that an accurate estimation of the target bone may be made.

Figure 19:
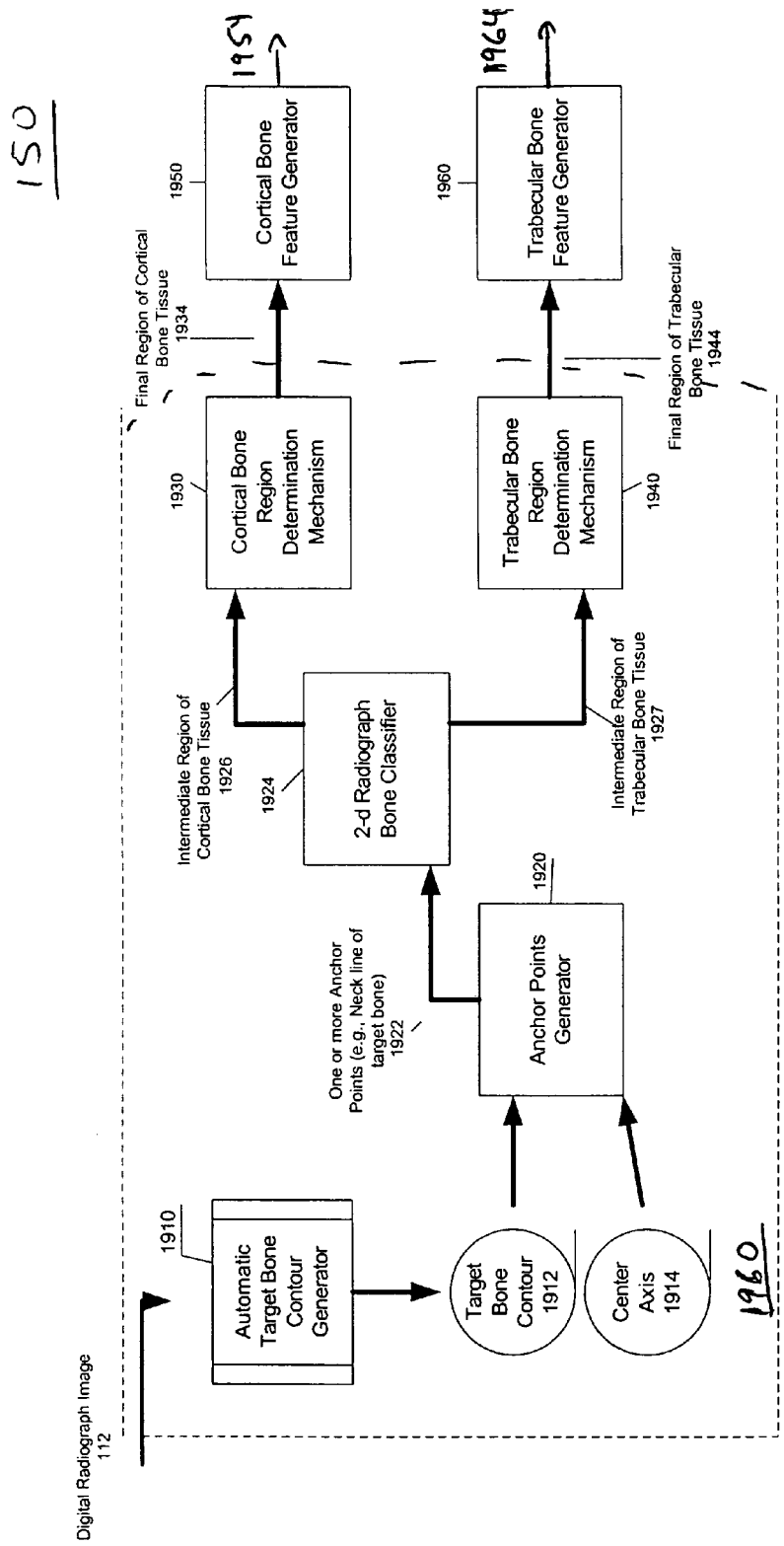
FIG. 19 is a block diagram illustrating in greater detail the target bone feature generation mechanism of FIG. 1 in accordance with another embodiment of the present invention.

Second Embodiment of Target Bone Feature Generation Mechanism that Employs a Two-Dimensional (2D) Bone Tissue Classifier FIG. 19 is a block diagram illustrating in greater detail the target bone feature generation mechanism 150 of FIG. 1 in accordance with another embodiment of the present invention. The target bone feature generation mechanism 150 includes automatic bone tissue region locator/extractor 1960. The automatic region of bone tissue locator/extractor 1960 includes an automatic target bone contour generator 1910 for manually or automatically generating a target bone contour 1912 and for manually or automatically generating the middle or center axis 1914 of the target bone.

The automatic region of bone tissue locator/extractor 1960 includes an anchor point generator 1920 for automatically generating one or more anchor points 1922. In one embodiment, the anchor points include a neckline that is a line that is the minimum width of the target bone in the horizontal direction. The automatic region of bone tissue locator/extractor 1960 also includes a 2D radiograph bone classifier 1924 for generating an intermediate region of cortical bone tissue 1926 and an intermediate region of trabecular bone tissue 1927. The automatic region of bone tissue locator/extractor 1960 also includes a cortical bone determination mechanism 1930 for automatically extracting with or without user intervention a final region of cortical bone tissue 1934 from the intermediate region 1926 and a trabecular bone region determination mechanism 1940 for automatically extracting with or without user input the final region of trabecular bone tissue 1944 from the intermediate region 1927. Specifically, the cortical bone determination mechanism 1930 generates one or more final regions of cortical bone tissue (e.g., region 896 and region 898 of FIG. 17), and the trabecular bone determination mechanism 1940 generates one or more final regions of trabecular bone tissue (e.g., region 894 and region 892) that may be used to analyze and determined bone features. It is noted that final region 894 and final region 892 are selected from intermediate circular region 834 and intermediate triangular region 910, respectively. It is also noted that the final regions 894 and 892 can be any geometric shape (e.g., a rectangular shape, a square, a circular shape, etc.). In one embodiment, can be a 128 pixel×128 pixel square area or region or a 256 pixel×256 pixel square area or region.

The target bone feature generation mechanism 150 also includes a cortical bone feature generator 1950 for manually or automatically generating at least one cortical bone feature 1954 and a trabecular bone feature generator 1960 for manually or automatically generating at least one trabecular bone feature 1964. The cortical bone feature 1954 can include, but is not limited to, a cortical bone dimension, cortical bone density, cortical bone mineral mass, cortical bone length, cortical bone volume, etc. The trabecular bone feature 1964 can include, but is not limited to, a trabecular bone dimension, trabecular bone density, trabecular bone mineral mass, trabecular bone length, trabecular bone volume, etc. Preferably, blocks 1910, 1920, 1930, 1940, 1950 and 1960 are configured to automatically determine or generate the target bone contour, center axis, cortical bone contour, trabecular bone contour, cortical and trabecular bone features, etc. However, the teachings of this invention are equally applicable to a system in which one or more of the above functions or task are performed with the aid of a user (i.e., with manual intervention of a user to select a region of interest or otherwise input information into the system or otherwise interact with the system).

Figure 20:
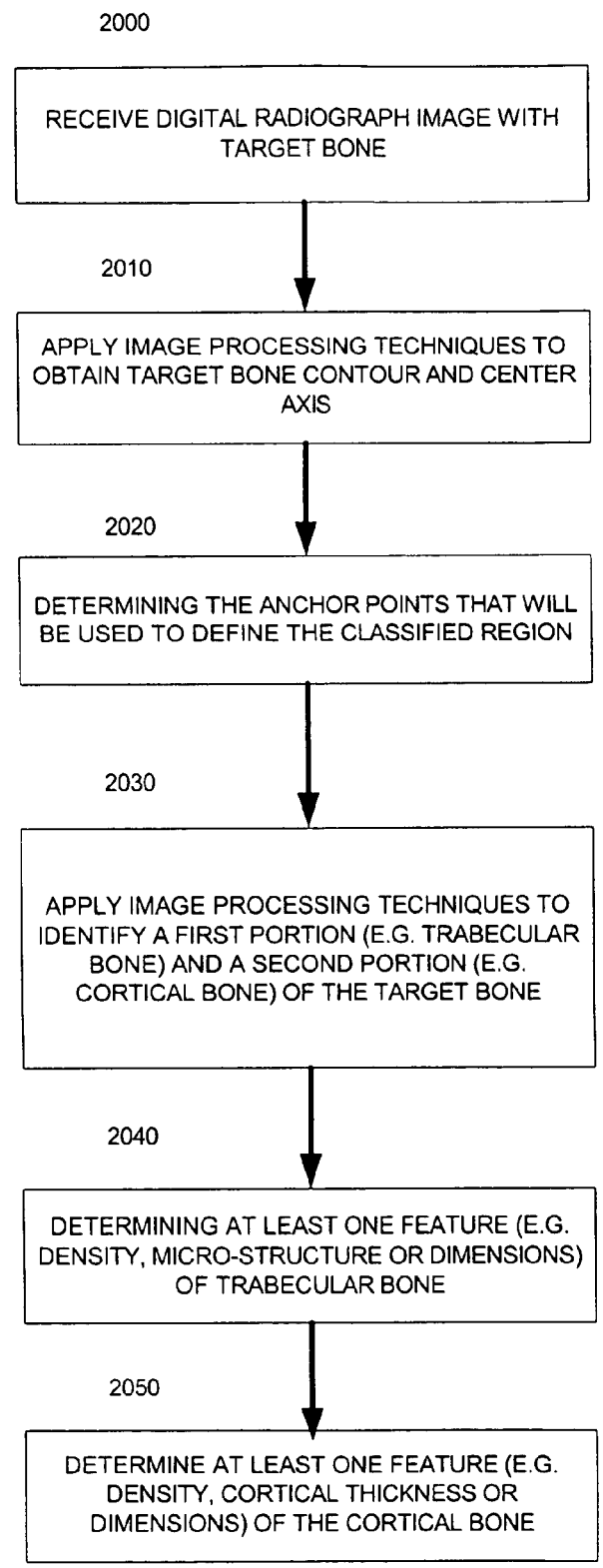
FIG. 20 is a flow chart illustrating the steps performed by the target bone feature generation mechanism of FIG. 19.

FIG. 20 is a flow chart illustrating the steps performed by the target bone feature generation mechanism of FIG. 19. In step 2000 a digital radiograph image (e.g., a digital version of a two-dimensional radiograph) that includes a target bone is received. The target bone includes a first type of bone tissue and a second type of bone tissue. It is noted that the digital image can be generated from a modality that generates digital images or the digital image can be generated from standard film or other hard copy medium through a digitization process (e.g., scanned into a corresponding digital image). For example, one manner to obtain a digital version of a two-dimensional radiograph is to digitize a radiograph with a digitizer. Alternatively, a Direct Digital Radiography system or other direct digital capture systems can be employed to directly generate a digital image (e.g., a digital version of a two-dimensional radiograph that includes a target bone). In a third approach, a re-useable plate and a reader (referred to as a "computed radiography (CR) system") is utilized by a regular X-ray machine to generate a digital file, such as a DICOM file. The digital version can be an image file that includes, but is not limited to, the following formats: a DICOM-compliant image file, TIFF image file, raw image file, JPEG image file, etc.

Step 2000 can include the step of applying background correction image processing methods and techniques to the background of the received digital image. These image processing methods to correct the background are known to those of ordinary skill in the art and will not be described in greater detail herein.

In step 2010, imaging processing techniques according to the invention are applied to the digital radiograph image to obtain the contour of the target bone and the middle axis (also referred to herein as the "center axis" or "target bone axis") of the target bone. For example, the left contour or the right contour may be utilized for the following processing steps. First, the target bone is automatically located. Next, certain portions of the target bone contour (e.g., the left contour 862 or right contour 864) and center line 804 of the target bone may be identified. The left bone contour 862, the right bone contour 864, and the center line 804 can be stored as three separate data structures (e.g., arrays).

In step 2020, at least one anchor point is automatically determined. Examples of anchor points for a target bone can include, but are not limited to, minimum width of a middle phalange, the most left and right points at both top and bottom portions of the target bone, a weighted center point of the target bone, and vertical and horizontal axes of the target bone.

In one embodiment, the anchor point that is generated can be the point on either the left contour or the right contour corresponding either to line 824 or line 884. In one embodiment, processing step 2020 may be implemented by utilizing the image processing techniques set forth in a pending patent application entitled, "Method and System for Assaying Joint-Degenerative Diseases," filed on Jul. 20, 2003 and owned by the assignee of the present application. The anchor point is utilized hereinafter in step 320 to automatically extract a region of a first type of bone tissue.

The method and system according to one embodiment of the invention receives the digital image and automatically classifies the first type of bone tissue, the second type of bone tissue, or both based on the digital image. Classification refers to identifying at least one region of the target bone as the first type of bone tissue, identifying at least one region of the target bone as the second type of bone tissue, or identifying at least one region of the target bone as the first type of bone tissue and identifying at least one region of the target bone as the second type of bone tissue.

In step 2030, imaging processing techniques according to the invention are applied to the digital radiograph image to automatically identify at least a portion of the trabecular bone and at least a portion of the cortical bone based on the contour of the target bone (e.g., either the left bone contour or the right bone contour), the center axis, and the anchor point. Image processing techniques for automatically identifying at least a portion of the trabecular bone and at least a portion of the cortical bone were described previously with reference to FIGS. 5-7. For example, processing step 2030 can include the step of automatically forming two triangular regions by connecting the most up-left, most up-right, most bottom-left and most bottom-right points identified previously (e.g., anchor points). Processing step 2030 can also include the step of automatically identifying or classifying a sub-area from the regions noted above that only contains either a proximal region of trabecular bone tissue or a distal region of trabecular bone tissue.

In step 2040, at least one feature (e.g., bone density, a bone dimension, bone mineral mass, bone volume, etc.) of the trabecular bone is determined. In step 2050, at least one feature (e.g., bone density, a bone dimension, bone mineral mass, bone volume, etc.) of the cortical bone is determined.

Lateral Cortical Line Determination Processing

Figure 21:
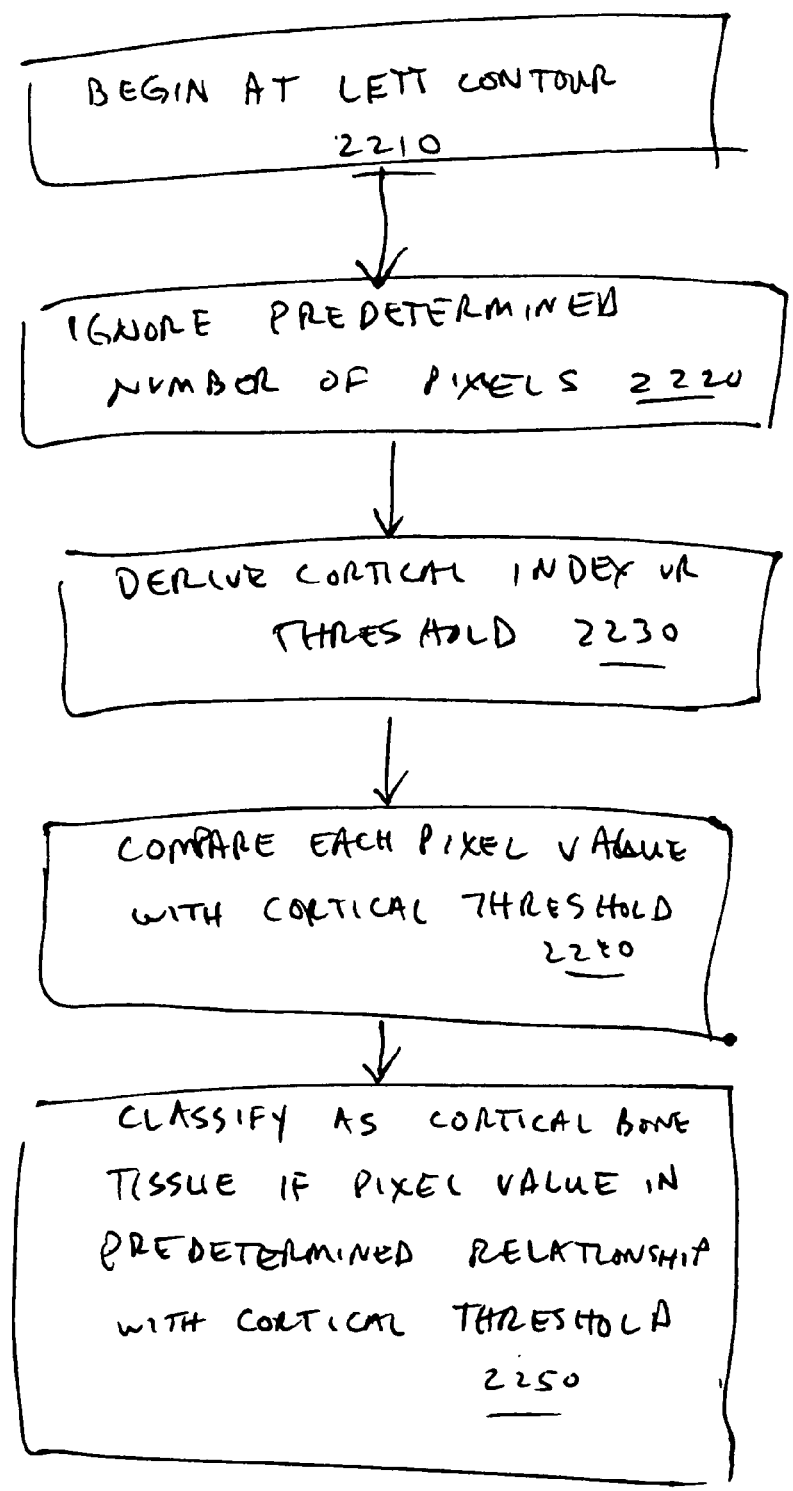
FIG. 21 is a flow chart illustrating the steps performed to determine the lateral cortical line or contour.

FIG. 21 is a flow chart illustrating the steps performed to determine the lateral cortical line or contour 860. In this approach, in step 2110, processing begins at a pixel or point on the left bone contour. The processing described below is performed line by line to identify or extract a region of cortical bone tissue. In step 2120, a predetermined number of pixels are ignored or skipped to eliminate edge effects. In step 2130, a cortical index or threshold is derived by using a predetermined number of pixels on the current processing line starting after the skipped pixels. In one example, an average value of the next three to five pixels is calculated. The average is then utilized as a cortical threshold (referred to herein also as a cortical index) for determining whether the pixels in the current line are identified as cortical bone tissue.

In step 2140, each pixel value, starting from the first pixel after the skipped pixels, is compared with the cortical threshold value. When the pixel value is in a predetermined relationship with the cortical threshold, in step 2150, the pixel is classified or identified as cortical bone tissue and added to a data structure (e.g., a 2D matrix), for example, that represents a region of cortical bone tissue. In one example, when the pixel value is within 20% (e.g., plus or minus) of the value of the cortical threshold, the current pixel is classified as cortical bone tissue.

Figure 22:
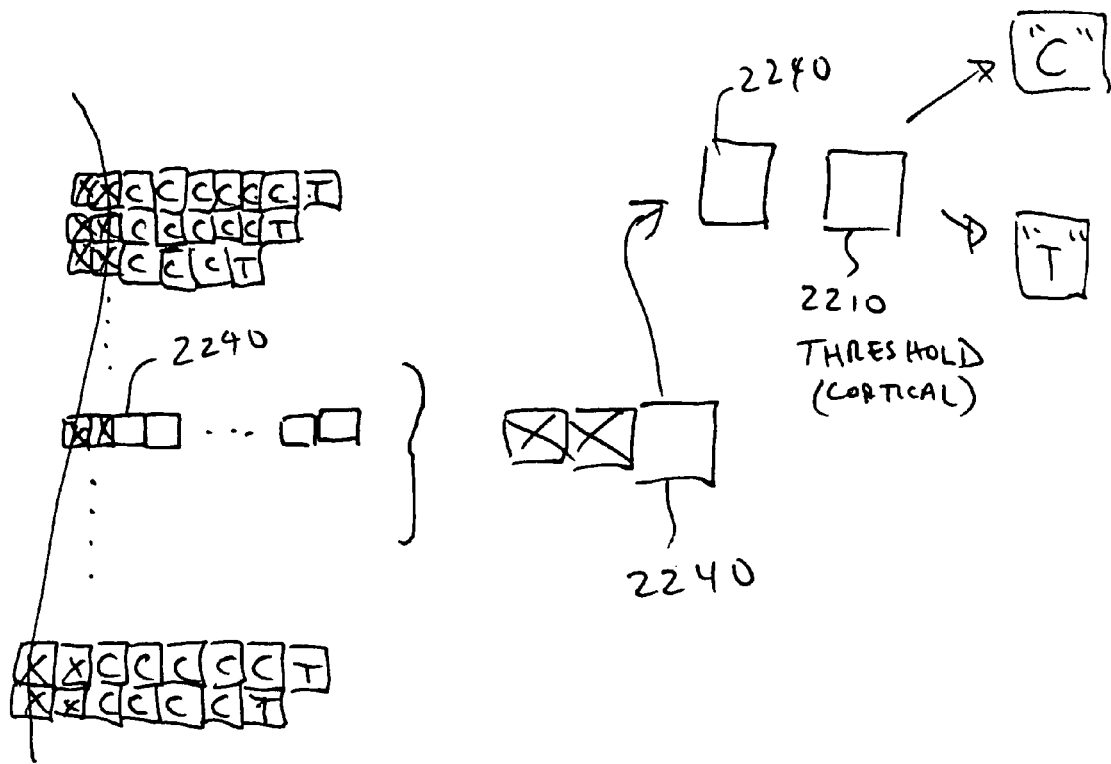
FIG. 22 illustrates conceptually how certain processing steps to determine the lateral cortical line of FIG. 21 are performed.

FIG. 22 conceptually illustrates the processing illustrated in FIG. 21. Those pixels that have been identified as cortical tissue have been denoted or labeled "C". Those pixels that are not labeled have yet to be processed. Those pixels that are labeled "T" are not cortical tissue. Pixels that are skipped are denoted with an "X". The cortical threshold 2210 is compared to each pixel in the current line. For example, the current pixel being processed 2240 is compared to the cortical threshold 2210.

Based on this comparison, the current pixel is classified or identified as a "C" or as "T." This processing continues line by line until an anchor point on the left contour is reached. The processing begins at another anchor point on the left contour. This processing may be repeated form the right side of the target bone using the right contour and associated anchor points.

Automatic Classification Method

First, a digital image (e.g., a scanned 2D radiograph) with a target bone is received. The target bone includes a first type of bone tissue (e.g., cortical bone tissue), a second type of bone tissue (e.g., trabecular bone tissue), or a first type of bone tissue, a second type of bone tissue. The contour (e.g., a right contour and a left contour) of the target bone and a center line for the target bone is automatically determined. Next, at least one anchor point along the contour of the target bone is automatically identified or determined. Based on target bone contour and anchor point, a region of the target bone is automatically distinguished, identified, or classified as a first bone tissue or a second bone tissue. The classified region can then be utilized to identify one or more bone features (e.g., density, thickness, dimensions, bone microstructure strength indicator, bone microstructure quality indicator)

In one embodiment, an anchor point on the target bone contour is automatically identified. The anchor point is utilized as a center point. A circular region is drawn using the anchor point as the center of the circular region and a predetermined radius. The radius can be adjusted to suit a particular application (e.g., type of bone, type of bone tissue to classify, etc.). The area outside of the circle is automatically classified as a first type of bone tissue (e.g., cortical bone tissue). Also, the area inside the circle is automatically classified as a second type of bone tissue (e.g., trabecular bone tissue).

According to a specific embodiment of the invention, an image processing method and system have been developed to distinguish cortical tissues from trabecular tissues in the middle phalange bones of the hands from a 2-dimentional (2D) hand x-ray image data (e.g., an x-ray image that is scanned or digitized at a predetermined resolution (e.g., a resolution of 230 dots per inch (dpi) or higher).

Assessment of Cortical Bone Tissue

Once a cortical bone tissue region has been automatically classified or identified by the method and system according to the invention, the cortical bone tissue region may be assessed. For example, qualitative and quantitative assessments of the cortical bone tissue (e.g., cortical tissue of the phalange bone) may be performed.

Spatial Domain Analysis of Cortical Bone Tissue

Once a region of the first bone tissue (e.g., cortical bone tissue) has been automatically classified or identified or located, the region can be employed to calculate a lateral thickness. In one embodiment, a lateral thickness index (LTI) is determined. For example, a cumulative quantification of cortical thickness along the lateral sides of a target bone (e.g., the middle phalange) may be assessed. First, either the left bone edge (e.g., left contour) or the right bone edge (e.g., right contour) is determined. Then, the cortical tissue edges (from the right contour and the left contour) are determined based on an optical density difference.

Local BMD Assessment

Once a region of the first bone tissue (e.g., cortical bone tissue) has been automatically classified or identified, the region can be employed to calculate a BMD based on the cortical bone tissue. For example, an optical density inside the selected region may be utilized to calculate BMD.

Frequency Domain Analysis of Cortical Bone Tissue

Once a region of the second bone tissue (e.g., trabecular bone tissue) has been automatically classified, identified, located or extracted, frequency domain analysis may be performed on the classified region. For example, a Fourier Transform analysis (signature) of trabecular bone tissue may be performed. First, power spectrum features (e.g., signature) of cortical tissues may be determined. For example, a power spectrum may be applied to the selected area or region. Also, the frequency of the cortical tissue may be defined and utilized for further assessment.

Assessment of Trabecular Bone Tissue

The method and system for automatically classifying trabecular bone tissue according to the invention are important for at least two reasons. First, trabecular bone tissue is the best indicator of bone mineral density (BMD) compared to other types of bone tissue. BMD in turn is an indicator commonly utilized by the medical community to diagnose osteoporosis.

Second, independent of BMD noted above, trabecular bone tissue is a good indicator of bone strength and bone quality. For example, a first patient who is 30 may have a BMD of 100 arbitrary units, and a second patient who is 70 may have the same BMD of 100 arbitrary units. Although both patients have a same measured BMD, the second patient, who is older, is still more susceptible to bone fracture because the bone quality and bone strength of the older patient is inferior when compared to the bone quality and bone strength than the younger patient. In this regard, trabecular bone tissue may be utilized to assess or determine the health and strength of bone microstructure, which can be employed to predict fracture risk of a patient in the event of a fall, etc. Consequently, a method and system for automatically classifying a trabecular region of a target bone according to the invention advantageously facilitates the determination of bone strength and bone quality (e.g., quality of the bone microstructure) and prediction of fracture risk.

Spatial Domain Analysis of Trabecular Tissue

According to one embodiment of the invention, once a region of the second bone tissue (e.g., trabecular bone tissue) has been automatically classified or identified, an assessment of bone mesh density may be performed. In one embodiment, a quantification of the mesh of trabecular bone is performed after pre-processing the image with a consistent threshold.

Figure 23:
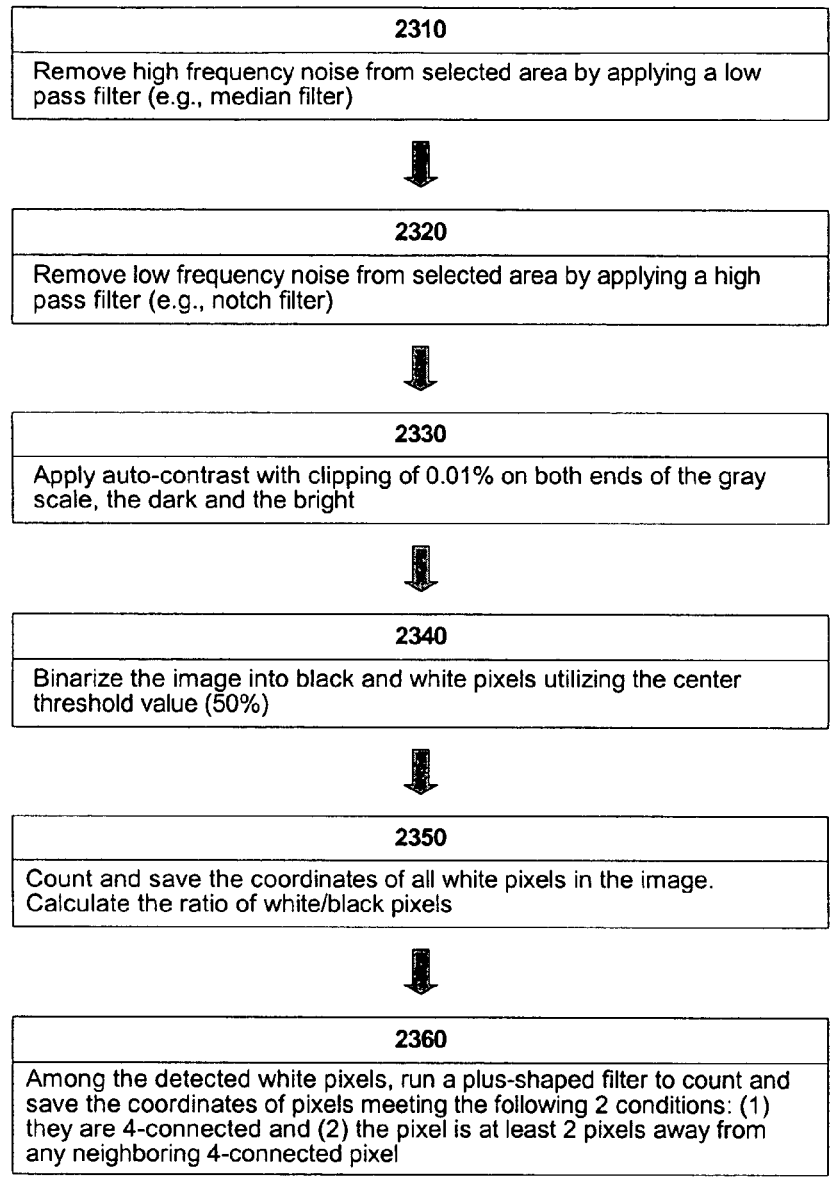
FIG. 23 is a flow chart illustrating the processing steps related to spatial domain analysis of trabecular tissue according to one embodiment of the invention.

FIG. 23 is a flow chart illustrating the processing steps related to spatial domain analysis of trabecular tissue according to one embodiment of the invention.

In step 2310, high frequency noise is removed from a selected area by applying a low pass filter (e.g., a median filter).

In step 2320, low frequency noise is removed from selected area by applying a high pass filter (e.g., notch filter).

In step 2330, an auto-contrast is applied with a clipping of a predetermined percentage (e.g., 0.01%) on both ends of the gray scale.

In step 2340, the image is binarized into black and white pixels by utilizing a predetermined center threshold value (e.g., 50%).

In step 2350, the coordinates of all white pixels in the image are counted and saved. A ratio of white/black pixels may also be calculated.

In step 2350, among the detected white pixels, a plus-shaped filter is utilized to count and to save the coordinates of pixels meeting the following conditions: (1) pixels that are 4-connected, and (2) the pixel is at least a predetermined number of pixels away (e.g., 2 pixels away) from any neighboring 4-connected pixel. In step 2360, the bright pixels that are 4-connected are counted. The number of the 4-connected pixels can be used to evaluate the strength of the bone.

Figure 24:
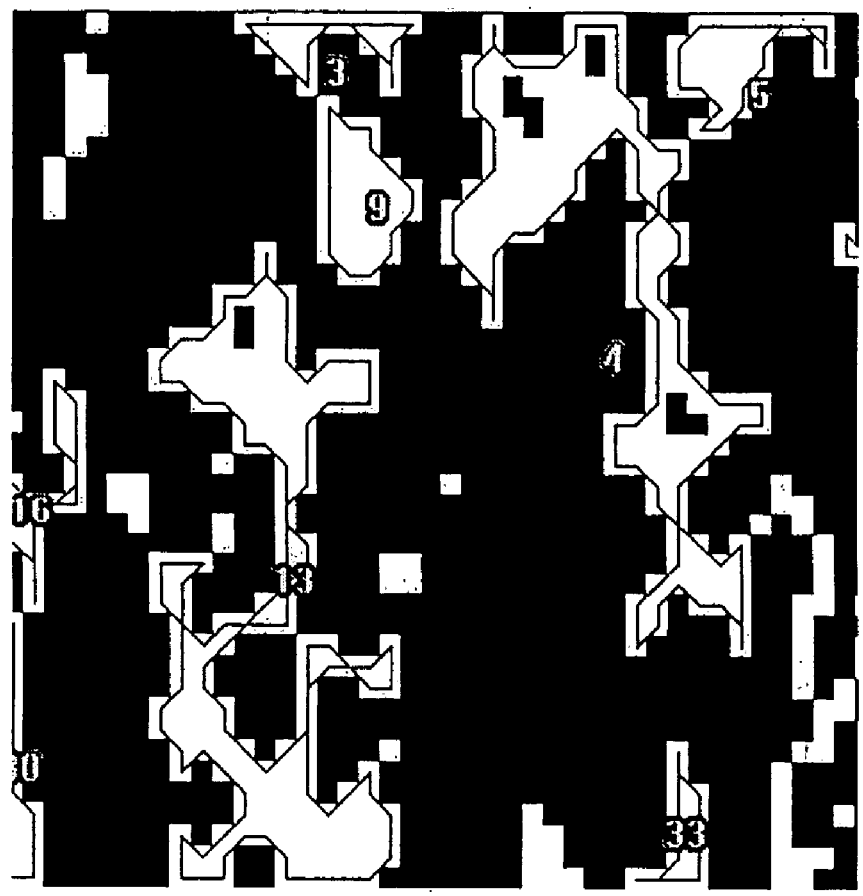
FIG. 24 illustrates an exemplary digital output image of trabecular bone microstructure after processing step 2340 of FIG. 23.

FIG. 24 illustrates an exemplary digital output image of trabecular bone microstructure after processing step 2340 of FIG. 23. The white pixels represent the microstructure of the trabecular bone, and the black pixels represent the background.

In an alternative embodiment, the following processing steps are performed. A median filter is applied to the selected area to eliminate high frequency noise. An equalized linear filter is applied to eliminate low frequency noise. A consistent threshold value (e.g., 50%) is utilized to binarize the resulting image. The 4-connected filled objects inside the image are counted. The distance among the 4-connected objects is measured. Then, the bright pixels are counted.

For healthy trabecular bone tissue, the number of 4-connected objects is relatively larger than the number of 4-connected objects in unhealthy trabecular bone tissue. Similarly, for healthy trabecular bone tissue, the distance between 4-connected objects is relatively smaller than the distance between 4-connected objects of unhealthy trabecular bone tissue. Similarly, for healthy trabecular bone tissue, the number of bright pixels is relatively larger than the number of bright pixels in unhealthy trabecular bone tissue.

For example, an unhealthy trabecular bone tissue (e.g., a relatively hollow trabecular bone microstructure) exhibits a small number of 4-connected objects, a large distance between 4-connected objects, and a small number of bright pixels.

It is noted that a database can be maintained for each patient so that upon a first test (e.g., X-ray exam), a personal baseline may be established for the patient. Alternatively, a national database can be maintained that compares the results of a particular test corresponding to a particular patient to a national average based on demographics, age, gender, etc.

In this manner, when a patient is re-tested after the passage of time, the test results may be compared by a medical professional to the personal baseline of the patient. Consequently, the baseline and the current test results may be compared to determine effects of treatment, to determine progression of disease, or to monitor deterioration of a bone condition, It is noted that this above methodology of establishing a database with person baselines and multiple tests over time is equally applicable to the other types of analysis of different types of bone tissue.

Local BMD Assessment

Once a region of the second bone tissue (e.g., trabecular bone tissue) has been automatically classified or identified, the region can be employed to calculate a BMD based on the trabecular bone tissue. For example, an optical density inside the selected region may be utilized to calculate BMD.

Frequency Domain Analysis of Trabecular Tissue

Once a region of the second bone tissue (e.g., trabecular bone tissue) has been automatically classified or identified, frequency domain analysis may be performed on the classified region. For example, a Fourier Transform analysis (signature) of trabecular bone tissue may be performed. A frequency domain analysis of trabecular tissue according to one embodiment of the invention includes following steps. A Fast Fourier Transform (FFT) power spectrum is applied to the selected trabecular region. Next, the DC component at the origin of the power spectrum analysis, the first moment (FMO) and the second moment (SMO) are calculated. Also, a fractal dimension is calculated.

The fractal dimension can be correlated with bone strength or bone quality. For example, when the condition of bone microstructure can be a value from one to six, a calculated fractal dimension value of five may be an indicator of good bone strength and healthy microstructure, whereas a calculated fractal dimension value of two may be an indicator of poor bone strength and unhealthy microstructure. Similarly, the first moment and the second moment can be utilized to assess the health or quality of bone microstructure.

Fourier Analysis Technique

The Fourier transform technique to calculate fractal dimension relies on the fact that the pattern to be analyzed is similar to a Gaussian noise or stochastic process. This technique has been applied to the analysis of radiographs, and has been applied in the assessment of trabecular bone structure. The Fourier transform measures how frequently a structure changes and for histomorphometry images, the power spectrum is related to the mean intercept length measure. In this technique, a two dimensional Fourier Transform, F(u,v), of the two dimensional region of interest within the trabecular bone in an x-ray image is taken. The two dimensional power spectrum of the Fourier Transform is then calculated as:

$$S^2(u,v)=|F(u,v)F^*(u,v)|$$

where $F^*(u,v)$ is the complex conjugate of the Fourier Transform. S (u,v) will be converted into the polar co-ordinate system and will be averaged for all angular distributions, for a given spatial frequency f. The averaged power spectrum is related to the fractal dimension as:

$$S(f) \alpha f-D.$$

The fractal dimension from the two dimensional power spectrum is calculated by taking the logarithm of the power spectrum S(f) versus log(f) curve, where the slope of the linear portion of the curve is related to D by the equation:

$$Dffi=(7-Slope)/2.$$

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for automatically extracting at least one region of a first type of bone tissue from a target bone comprising the steps of:
   receiving a digital radiograph image with the target bone; and
   automatically identifying at least one region of a first type of bone tissue based on the digital radiograph image; wherein automatically identifying at least one region of a first type of bone tissue based on the digital radiograph image further comprises
   automatically generating at least one region of trabecular bone tissue; wherein automatically generating at least one region of trabecular bone tissue further comprises
   generating an intermediate region of trabecular bone tissue based on one of a left contour and right contour, a center axis, and at least one anchor point; and
   generating a final region of trabecular bone tissue based on the intermediate region of trabecular bone tissue.

2. The method of claim 1 further comprising:
   utilizing the identified region of a first type of bone tissue for one of qualitative analysis, quantitative analysis, spatial domain analysis, and frequency domain analysis.

3. The method of claim 1 wherein based on the digital radiograph image automatically identifying at least one region of a first type of bone tissue further comprises:
   automatically generating at least one of a left bone contour and a right bone contour for the target bone contour and a center axis;
   automatically generating at least one anchor point on one of the right contour and the left contour; and
   using the one of the left contour and right contour, center axis, and the anchor point to automatically extract at least one region of a first type of bone tissue.

4. The method of claim 1 wherein based on the digital radiograph image automatically identifying at least one region of a first type of bone tissue further comprises:
   automatically generating at least one region of cortical bone tissue.

5. The method of claim 4 further comprising:
   performing spatial analysis on the identified region of cortical bone tissue.

6. The method of claim 4 further comprising:
   performing frequency analysis on the identified region of cortical bone tissue.

7. The method of claim 4 further comprising:
   based on the region of cortical bone tissue, generating a feature of the cortical bone tissue.

8. The method of claim 1 further comprising:
   performing spatial analysis on the identified region of trabecular bone tissue.

9. The method of claim 1 further comprising:
   performing frequency analysis on the identified region of trabecular bone tissue.

10. The method of claim 1 further comprising:
    generating the digital radiograph image with a target bone by employing one of a direct radiograph system, a computed radiograph system, and a film-based system that includes a digitizer; and
    wherein the digital image is one of a DICOM-compliant digital image, a 12-bit gray scale image, a JPEG image, a TIFF image, and a raw image.

11. The method of claim 1 further comprising:
    based on the final region of trabecular bone tissue, generating a feature of the trabecular bone tissue.

12. A system for automatically generating at least one feature of a target bone comprising:
    an automatic bone tissue region extractor for automatically extracting at least one region of a first type of bone tissue from the target bone based on a digital radiograph image automatically identifying at least one region of a first type of bone tissue; wherein the automatic bone tissue region extractor includes a trabecular bone tissue determination mechanism for automatically extracting at least one region of trabecular bone tissue; wherein the automatic bone tissue region extractor generates an intermediate region of trabecular bone tissue based on one of a left contour and right contour, a center axis, and at least one anchor point; and generates a final region of trabecular bone tissue based on the intermediate region of trabecular bone tissue; and a feature mechanism for generating at least one feature of the target bone based on the extracted region of first type of bone tissue.

13. The system of claim 12 wherein the automatic bone tissue region extractor includes a cortical bone tissue determination mechanism for automatically extracting at least one region of cortical bone tissue.

14. The system of claim 12 wherein the automatic bone tissue region extractor includes a contour generator for automatically generating a contour of the target bone that includes a left contour and a right contour.

15. The system of claim 12 wherein the automatic bone tissue region extractor includes a center axis generator for automatically generating a center axis of the target bone.

16. The system of claim 12 wherein the automatic bone tissue region extractor includes an anchor point generator for automatically generating at least one anchor point.

17. The system of claim 12 further comprising:

a source for generating the digital radiograph image with the target bone; wherein the source includes one of a direct radiograph system, a computed radiograph system, and a film-based system that includes a digitizer.

* * * * *